United States Patent [19]
Hieda

[11] Patent Number: 6,088,057
[45] Date of Patent: *Jul. 11, 2000

[54] IMAGE PICKUP APPARATUS WITH REDUCED SIGNAL NOISE

[75] Inventor: Teruo Hieda, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/514,003

[22] Filed: Aug. 11, 1995

[30] Foreign Application Priority Data

Aug. 19, 1994 [JP] Japan .................................. 6-195266

[51] Int. Cl.⁷ ................................................ H04N 5/235
[52] U.S. Cl. .......................... 348/243; 348/229; 348/248
[58] Field of Search .................................... 348/207, 222, 348/229, 241, 243, 248, 249, 250, 255, 607, 619, 620; 250/208.1; H04N 5/235

[56] References Cited

U.S. PATENT DOCUMENTS

| | | | |
|---|---|---|---|
| 4,712,138 | 12/1987 | Kyuma et al. | 358/213.31 |
| 4,748,506 | 5/1988 | Hieda | 358/213.18 |
| 4,814,861 | 3/1989 | Hieda | 358/29 |
| 4,833,538 | 5/1989 | Hieda | 358/182 |
| 4,884,128 | 11/1989 | Hieda | 358/29 |
| 4,963,982 | 10/1990 | Hieda | 358/213.18 |
| 5,086,344 | 2/1992 | D'Luna et al. | 358/213.15 |
| 5,153,421 | 10/1992 | Tandon et al. | 250/208.1 |
| 5,278,658 | 1/1994 | Takase | 358/213.15 |
| 5,434,619 | 7/1995 | Yonemoto | 348/241 |
| 5,475,427 | 12/1995 | Horowitz | 348/241 |
| 5,585,652 | 12/1996 | Kamasz et al. | 257/231 |

*Primary Examiner*—Wendy Garber
*Assistant Examiner*—Ngoc-Yen Vu
*Attorney, Agent, or Firm*—Fitzpatrick, Cella, Harper & Scinto

[57] ABSTRACT

To obtain an image pickup apparatus capable of reducing the influence of noise, an image of an object is photographed by a CCD through an image pickup optical system. The CCD output is converted into a digital signal by sequentially processing it by a sample-and-hold circuit, a variable gain amplifier, and an A/D converter, in a digitization circuit which is formed into an IC. This digital signal is applied to a digital processing circuit on an IC different from the IC of the digitization circuit. There the digital signal is converted into a digital video signal of a predetermined format. With this arrangement, the processing in the digitization circuit is done without being influenced by noise generated by the subsequent digital processing circuit.

7 Claims, 8 Drawing Sheets

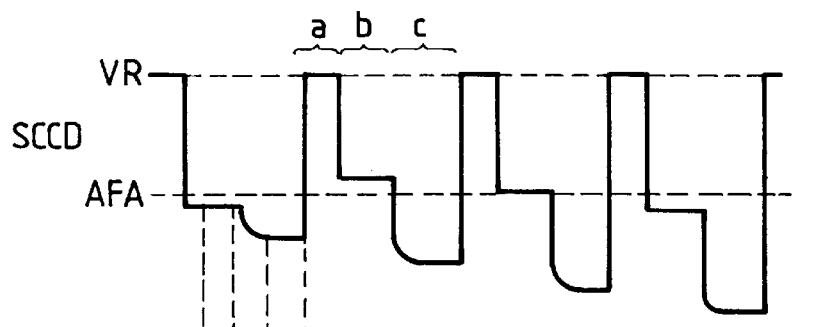
FIG. 3A SCCD
FIG. 3B PN
FIG. 3C PS
FIG. 3D SN
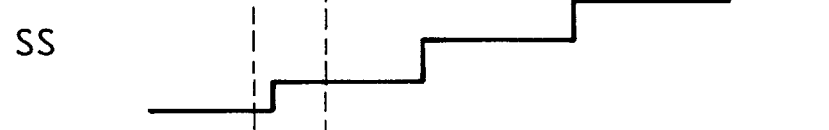
FIG. 3E SS
FIG. 3F PSW
FIG. 3G SNS
FIG. 3H PCL
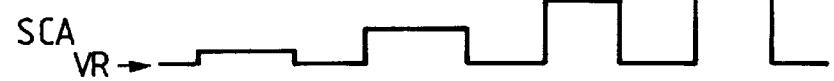
FIG. 3I SCA FIG. 5A  SCCD 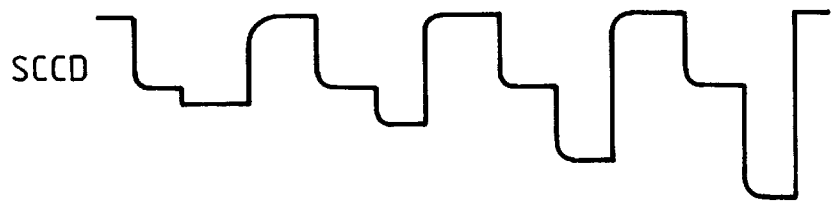
FIG. 5B  PN 
FIG. 5C  PN2 
FIG. 5D  SN 
FIG. 5E  PS 
FIG. 5F  PS2 
FIG. 5G  SS 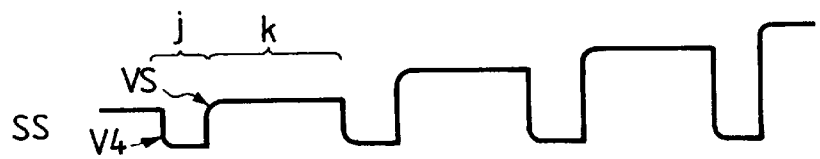
FIG. 5H  PSW 
FIG. 5I  SNS 

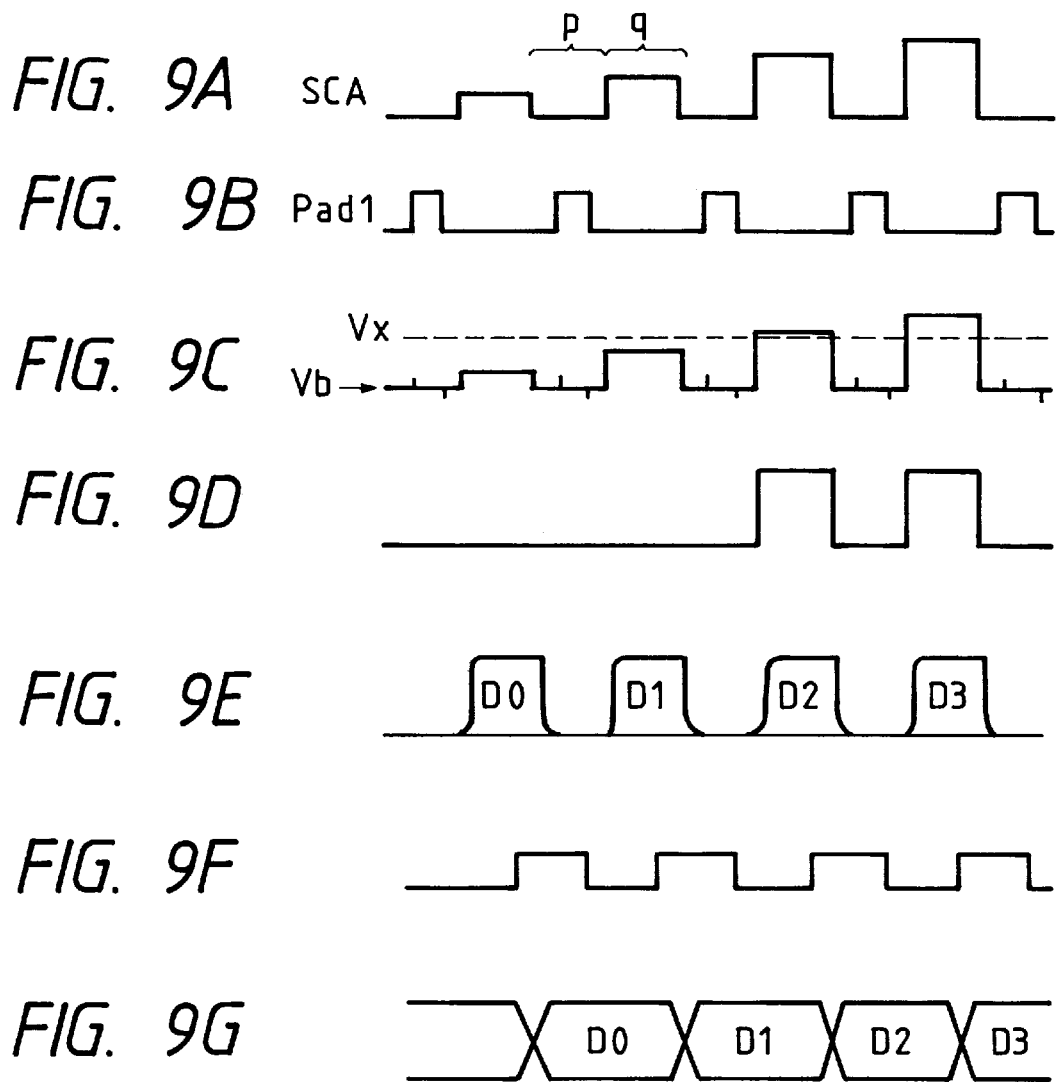

IMAGE PICKUP APPARATUS WITH REDUCED SIGNAL NOISE

BACKGROUND OF THE INVENTION

1. Field of the Invention

The present invention relates to an image pickup apparatus for performing digital signal processing.

2. Related Background Art

With the progress of semiconductor technologies, image pickup apparatuses using a CCD as a solid state image sensor have been decreased in size and weight and improved in performance. In particular, with the development of digital technologies a large number of image pickup apparatuses have been proposed recently, in which most internal signal processing of the apparatus is done by digital signal processing using a digital IC.

In these apparatuses, a signal portion is extracted from an output signal of a CCD acting as an image sensor by using a sample-and-hold circuit. After the gain of the signal portion is changed by a variable gain amplifier, the signal is converted into a digital signal by an A/D converter. The resulting digital signal is applied to the digital IC described where the signal is subjected to digital signal processing. The processed signal is D/A-converted and output to a VTR or a television monitor. Alternatively, the signal is output to external equipment as a digital video signal without being D/A-converted.

In these conventional apparatuses, since the CCD output signal is weak and fast, the sample-and-hold circuit uses a bipolar process IC having a high S/N ratio and good frequency characteristics. The variable gain amplifier uses a bipolar process IC which has good frequency characteristics, reduces low-frequency noise, and causes little variation in the manufacture. Also, the A/D converter uses a CMOS analog process IC in order to reduce the consumption power.

Unfortunately, in these conventional image pickup apparatuses the weak output signal from the CCD is sometimes affected by noise generated by the digital processing circuit, resulting in a low S/N ratio. If the noise is low-frequency noise, it is possible to reduce it by double correlation sampling. However, in this case a high-speed operation is necessary to improve the noise reduction performance, and this further increases the consumption power and also requires a high accuracy. The result is a problem of characteristic variations in the manufacture, and consequently the yield is decreased or an adjustment circuit is required.

The connecting portion between, e.g., the sample-and-hold circuit and the variable gain amplifier for processing analog signals is also readily influenced by the noise from the digital processing circuit. Furthermore, as a problem of the whole image pickup apparatus, in placing the analog processing circuit and the digital processing circuit inside a small apparatus, it is necessary to form an electromagnetic shield in order to remove the mutual influence, or the apparatus cannot be miniaturized to a necessary size in order to prevent the noise influence. Also, the S/N ratio is lowered.

Especially when analog signals are transferred from the sample-and-hold circuit to the variable gain amplifier and from the variable gain amplifier to the A/D converter, the S/N ratio is gradually lowered due to variations in the temperature resulting from active elements of the individual circuits, low-frequency noise, external noise, or power supply noise. To prevent this, the characteristics of each individual circuit must be extremely improved, with the result that the circuit configuration is complicated and the consumption current is increased. It is also necessary to add a compensation circuit for a voltage drift caused by a temperature change or to add an adjustment circuit. Furthermore, if the whole apparatus is electromagnetically shielded to prevent noise from the outside of the apparatus from affecting the analog signals, the apparatus is increased in size and weight.

Moreover, it is necessary to use bipolar process ICs in the sample-and-hold circuit and the variable gain amplifier, since the accuracy required of ICs in these circuits is very high. This increases the consumption power and decreases the degree of integration.

SUMMARY OF THE INVENTION

It is an object of the present invention to provide an image pickup apparatus which solves the problems of the conventional apparatuses as described.

It is another object of the present invention to provide an image pickup apparatus which reduces noise.

It is still another object of the present invention to provide a small-sized, low-power-consumption image pickup apparatus.

According to one aspect of the present invention, there is provided an image pickup apparatus comprising an image sensor having a predetermined number of pixels, for converting an optical image of an object to be photographed into an electrical signal and outputting the signal, a digitization circuit for converting the output signal from the image sensor into a digital signal by sequentially performing sample and hold, gain change, and A/D conversion, and a digital processing circuit for performing signal processing for the digital signal from the digitization circuit and converting the digital signal into a digital video signal of a predetermined format, wherein each of the digitization circuit and the digital processing circuit comprises a one-chip semiconductor integrated circuit.

According to another aspect of the present invention, a signal between the sample-and-hold output and the gain change, or a signal between the gain change output and the A/D conversion, in the digitization circuit, consists of a noise portion and a signal portion, for each signal of one pixel of the image sensor.

According to one embodiment of the present invention, the digitization circuit processes a weak output signal from the image sensor by using the IC different from the IC of the digital processing circuit. Consequently, it is possible to minimize the influence which the noise generated by the digital processing circuit has on the output signal from the image sensor. Also, the influence of the noise can be reduced since all analog signals are processed inside the IC of the digitization circuit.

According to another embodiment of the present invention, in transferring the signals from the sample-and-hold circuit to the variable gain amplifier and from the variable gain amplifier to the A/D converter, a noise portion and a signal portion are transmitted for each pixel, and in the subsequent stage the noise portion is essentially subtracted from the signal portion. Therefore, the signals are unaffected by a temperature change, external noise, power supply noise, and low-frequency noise generated by active elements.

BRIEF DESCRIPTION OF THE DRAWINGS

FIGS. 3A to 3I are timing charts for explaining the operation of the digitization circuit in FIG. 2;

FIGS. 5A to 5I are timing charts for explaining the operation of FIG. 4;

FIGS. 9A to 9G are timing charts for explaining the operation of the A/D converter in FIG. 8.

DETAILED DESCRIPTION OF THE PREFERRED EMBODIMENTS

Figure 1:
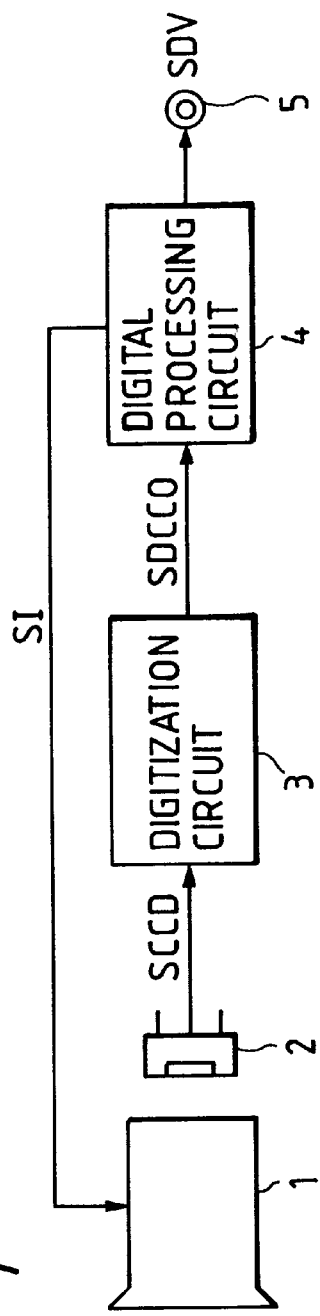
FIG. 1 is a block diagram showing the first embodiment of the present invention.

FIG. 1 is a block diagram of an image pickup apparatus according to the first embodiment of the present invention.

Referring to FIG. 1, this image pickup apparatus comprises an image pickup optical system 1 including an image pickup lens and a stop, a CCD 2 which is a color image sensor, and a digitization circuit 3 which converts a CCD output signal into a digital signal by using a sample-and-hold circuit, a gain variable amplifier, and an A/D converter. These components of the digitization circuit 3 are formed on a one-chip IC. A digital processing circuit 4 forms a digital video signal from the digital CCD output signal by performing signal processing such as color separation, gamma correction, and edge emphasis, and also forms a stop control signal SI. The digital processing circuit 4 also is formed on a one-chip IC different from the IC of the digitization circuit 3. An output terminal 5 outputs the digital video signal to external equipment (not shown) such as a VTR or a television monitor.

The operation will be described below.

The light quantity of an image of an object to be photographed (not shown) is controlled through the image pickup optical system 1. The image is formed on the photoelectric conversion surface of the CCD 2 where the image is photoelectrically converted. A CCD output signal SCCD is obtained by sequentially reading the CCD 2. This signal SCCD is applied to the digitization circuit 3. There the input signal SCCD is sampled and held, and the consequent output is amplified with a predetermined gain by the gain variable amplifier. The amplified signal is converted into a digital CCD signal SDCCD by the A/D converter, and this signal SDCCD is output.

The digital processing circuit 4 receives the SDCCD signal and performs processing such as color separation, gamma correction, and edge emphasis for the signal, thereby forming a digital video signal SDV. The digital processing circuit 4 outputs the signal SDV from the output terminal 5 to the external equipment described. Also, the digital processing circuit 4 forms a stop control signal SI corresponding to the input signal SDCCD and controls the stop of the image pickup optical system 1, thereby optimizing the incident light quantity of the CCD 2.

The digital processing circuit 4 is a one-chip integrated circuit of, e.g., a CMOS logic process, since the circuit 4 exclusively performs digital processing. The digitization circuit 3 also is a one-chip integrated circuit of, e.g., a CMOS analog-digital process or a Bi-CMOS analog-digital process.

Figure 2:
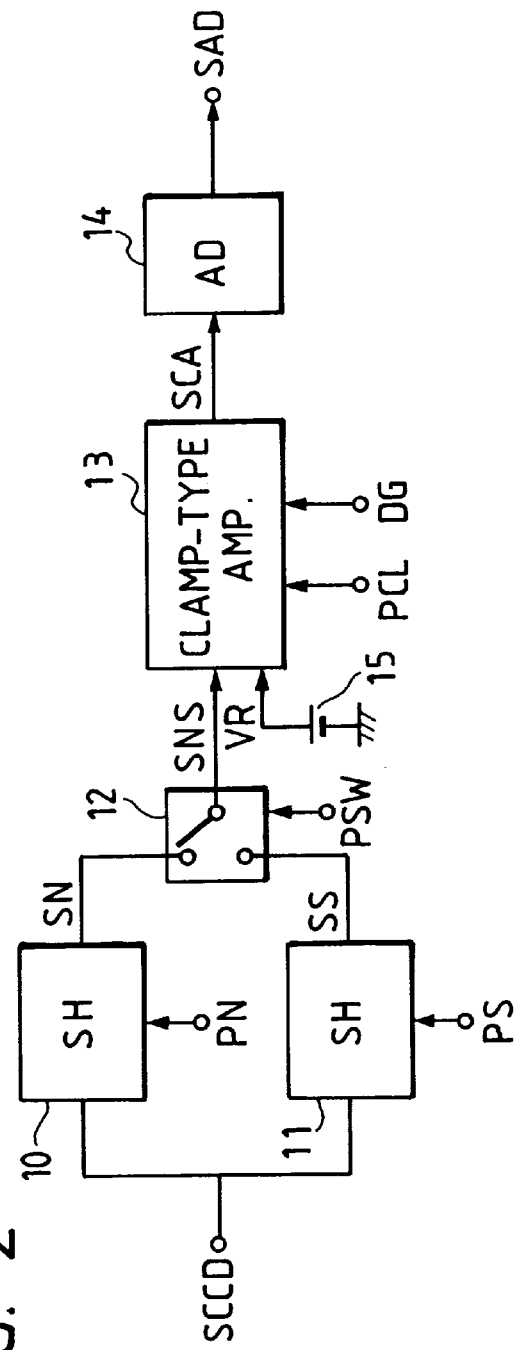
FIG. 2 is a block diagram showing the configuration of a digitization circuit in FIG. 1.

FIG. 2 shows the configuration of the digitization circuit 3 of the first embodiment of the present invention.

Referring to FIG. 2, the digitization circuit 3 consists of sample-and-hold circuits 10 and 11, a switch circuit 12, a clamp-type amplifier 13 which clamps and amplifies a signal, an A/D converter 14, and a reference voltage source 15.

The operation will be described below.

The CCD output signal SCCD is applied to the sample-and-hold circuits 10 and 11. The sample-and-hold circuit 10 forms a signal SN by extracting a noise portion (to be described later with reference to FIG. 3), from the output of the CCD 2, by using a pulse PN corresponding to the noise portion. The pulse PN is generated by a sync pulse generation circuit (not shown) in synchronism with a driving pulse of the CCD 2 or a sync pulse for operating the signal processing. The sample-and-hold circuit 11 forms a signal SS by extracting a signal portion (to be described later), from the output of the CCD 2, by using a pulse PS which corresponds to the signal portion and is also generated by the sync pulse generation circuit. These signals SN and SS are input to the switch circuit 12. The switch circuit 12 selects one of the input signals SN and SS by using a switch pulse PSW (to be described later) generated by the sync pulse generation circuit, and applies the selected signal as a signal SNS to the clamp-type amplifier 13.

The clamp-type amplifier 13 clamps the input signal SNS as a reference voltage VR of the reference voltage source 15 in accordance with a clamp pulse PCL generated by the sync pulse generation circuit, and amplifies the clamped signal with a gain corresponding to a gain set signal DG generated by a gain set switch (not shown) or a camera control circuit (not shown), thereby outputting a signal SCA. This signal SCA is converted by the A/D converter 14 into a digital signal SAD having a resolution of, e.g., 10 bits, which is required for digital signal processing.

FIGS. 3A to 3I are timing charts for explaining the operation of the digitization circuit 3.

FIG. 3A shows the waveform of the output signal SCCD from the CCD 2. VR indicates the reset voltage in the output portion of the CCD 2, and VFA indicates the average value of the floating voltages in the output portion of the CCD 2. In outputting a signal of one pixel, the CCD 2 has three states, a reset state a, a floating state b, and a signal output state c, in accordance with the pulse from the sync pulse generation circuit. Note that the lower the position in the chart the higher the level of the CCD output signal SCCD, since the signal SCCD is a negative signal.

FIG. 3B shows the pulse SN corresponding to the noise portion applied to the sample-and-hold circuit 10. This pulse PN has a timing corresponding to the floating state b. With this pulse PN the sample-and-hold circuit 10 extracts the noise portion from the signal SCCD.

FIG. 3C shows the pulse PS corresponding to the signal portion applied to the sample-and-hold circuit 11. This pulse PS has a timing corresponding to the signal output state c. With this pulse PS the sample-and-hold circuit 11 extracts the signal portion from the signal SCCD.

FIG. 3D shows the output signal SN from the sample-and-hold circuit 10. Since this signal SN is inverted into a positive signal inside the sample-and-hold circuit 10, the upper the position in the chart the higher the level of the signal. Also, the level of the noise portion of the signal SCCD corresponding to PN is output, as shown in FIG. 3D.

FIG. 3E shows the output signal SS from the sample-and-hold circuit 11. As with the signal SN, this signal SS also is inverted into a positive signal inside the sample-and-hold circuit 11. The level of the signal portion of the signal SCCD corresponding to PS is output, as illustrated in FIG. 3E.

FIG. 3F shows the switch pulse PSW of the switch circuit 12. In FIG. 3F, SN and SS are chosen in portions d and e, respectively.

FIG. 3G shows the output SNS from the switch circuit 12. SN is output in a portion f corresponding to d in PSW, and SS is output in a portion g corresponding to e in PSW.

FIG. 3H shows the clamp pulse PCL applied to the clamp-type amplifier 13. The pulse is generated in the portion f in SNS, i.e., in the portion corresponding to SN. As described earlier, the clamp-type amplifier 13 clamps this portion at the reference voltage VR and amplifies the signal.

FIG. 3I shows the output SCA from the clamp-type amplifier 13. In this signal SCA, as in the above signals, the noise and the signal portions are alternately output in units of pixels.

As described in the configuration shown in FIG. 2, the noise and the signal portions are transmitted in units of pixels in transferring the signals from the sample-and-hold circuits 10 and 11 to the clamp-type amplifier 13 and from the clamp-type amplifier 13 to the A/D converter 14. Consequently, the signals are unaffected by a temperature variation, external noise, power noise, and low-frequency noise generated by active elements. Therefore, even if the characteristics of the individual circuits are unsatisfactory, e.g., even if the values of a power-supply voltage variation, the suppression ratio of a voltage drift caused by a temperature change, and a low-frequency noise voltage are much larger than are commonly needed, satisfactory characteristics can be obtained as a whole circuit.

This eliminates the need for a correction circuit for each circuit, and it is also unnecessary to flow extra current to improve the characteristics. As a result, no adjustment is required and reductions in cost, consumption power, and circuit area can be achieved. Furthermore, when miniaturized the apparatus is not easily influenced by the peripheral circuits, so an electromagnetic shield is unnecessary. In particular, the use of MOS transistors as active elements greatly reduces the consumption power and increases the integration degree. This makes a small-sized, low-power-consumption apparatus feasible.

Figure 4:
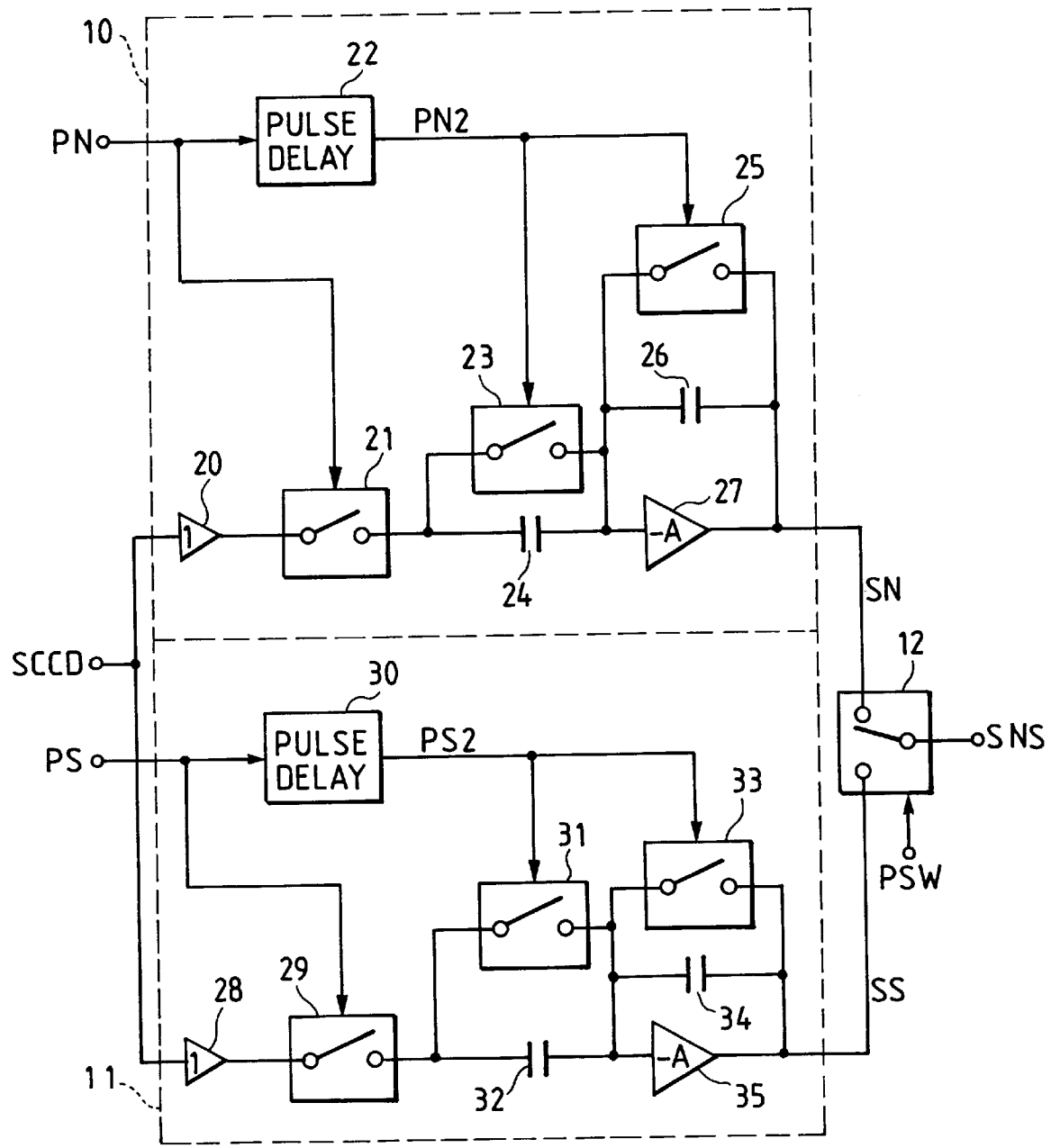
FIG. 4 is a circuit diagram showing the configuration of sample-and-hold circuits in the digitization circuit in FIG. 2.

FIG. 4 shows the configuration of the sample-and-hold circuits 10 and 11.

The configuration shown in FIG. 4 consists of buffer amplifiers 20 and 28, switch circuits 21, 23, 25, 29, 31, and 33, pulse delays 22 and 30, capacitors 24, 26, 32, and 34, and inverting amplifiers 27 and 35.

The parts 22 to 27 constitute the sample-and-hold circuit 10, and the parts 28 to 35 constitute the sample-and-hold circuit 11.

The operation will be described below.

The output signal SCCD from the CCD 2 enters the switch circuit 21 after being amplified by the buffer amplifier 20. Since the switch circuit 21 is applied with the pulse PN, FIG. 3, the switch circuit 21 is turned on and connected to the switch circuit 23 and the capacitor 24 when SCCD has a noise portion in the floating state. A pulse PN2 applied to the switch circuit 23 at that time is formed by delaying PN by the pulse delay 22. However, since this pulse PN2 has not come yet, the switch circuit 23 is kept off. Consequently, the output of the switch circuit 21 is charged on the capacitor 24. The electrode of the capacitor 24 away from the switch circuit 21 is connected to the inverting amplifier 27, the capacitor 26, and the switch circuit 25. At this time the switch circuit 25 is kept off since the switch circuit 25 operates with the pulse PN2 similarly to the switch circuit 23.

If the input impedance of the inverting amplifier 27 is sufficiently low, the electric charge from the capacitor 24 entirely flows into the capacitor 26. As a result, the signal SN changes its voltage in accordance with the charge amount flowing into the capacitor 26. The gain, GI, of this amplifier is represented by $$G1=V2/V1=-C1/(C2+(C1+C2)/A) \tag{1}$$

where C1 is the capacitance of the capacitor 24, C2 is the capacitance of the capacitor 26, −A is the gain of the inverting amplifier 27, V1 is the output voltage of the switch circuit 21, and V2 is the voltage of SN. If A is sufficiently large, $$G1=-C1/C2 \tag{2}$$

That is, the gain GI can be represented by the ratio of the two capacitors 24 and 26.

When a predetermined time which is determined by the pulse delay 22 elapses after the above operation, the switch circuit 21 is turned off, and the switch circuits 23 and 25 are turned on. Consequently, the capacitors 24 and 26 are discharged by the switch circuits 23 and 25, respectively, and the respective charge amounts become 0. The output voltage at that time is a predetermined value determined by the characteristic of the inverting amplifier 27. The signal SN thus formed is applied to one input terminal of the switch circuit 12 as described previously.

The operation of the sample-and-hold circuit 11 constituted by the parts 28 to 35 is also done in the same fashion as above, except that the operation pulse is PS and the signal portion of the output SCCD from the CCD 2 is extracted. The output SS formed in this way is applied to the other input of the switch circuit 12 and then to the clamp-type amplifier 13, as SNS, which is switched by PSW.

FIGS. 5A to 5I are timing charts for explaining the operation of FIG. 4.

FIG. 5A shows the output signal SCCD from the CCD 2, as in FIG. 3A.

FIG. 5B shows the pulse PN corresponding to noise, as in FIG. 3B.

FIG. 5C shows the pulse PN2 delayed by the pulse delay 22. This pulse PN2 is delayed by time t1, as shown in FIG. 5C FIG. 5D shows the output SN from the sample-and-hold circuit 10. In this SN, in a portion indicated by h a predetermined voltage V3 is output, which is determined by the characteristic of the inverting amplifier 27 when the switch circuits 23 and 25 are turned on by PN2. A portion i indicates a noise output voltage VN generated when the switch circuit 21 is turned on by PN.

FIG. 5E shows the pulse PS corresponding to the same signal as in FIG. 3C.

FIG. 5F shows the pulse PS2 delayed by the pulse delay 30. This pulse PS2 is delayed by time t2, as shown in FIG. 5F.

FIG. 5G shows the output SS from the sample-and-hold circuit 11. In this SS, in a portion indicated by j a predetermined voltage V4 is output, which is determined by the characteristic of the inverting amplifier 35 when the switch circuits 31 and 33 are turned on by PS2. A portion k indicates a signal output voltage VS generated when the switch circuit 29 is turned on by PS.

FIG. 5H shows the switch pulse PSW of the switch circuit 12, as in FIG. 3F. A portion of level 0 corresponds to the portion i in SN, and a portion of level 1 corresponds to the portion k in SS.

FIG. 5I shows the output voltage SNS from the switch circuit 12, as in FIG. 3G.

Note that in FIG. 4, PN2 and PS2 can also be generated, together with PN and PS, by the sync pulse generation circuit without using the pulse delays 22 and 30. Alternatively, it is also possible to generate PN2 and PS2 by the sync pulse generation circuit and form PS and PN from PN2 and PS2 by using the pulse delays.

The configuration shown in FIG. 4 makes use of switch circuits, capacitors, buffer amplifiers, inverting amplifiers, and pulse delays, and these constituent components can be realized very easily by using MOS transistors. When the configuration shown in FIG. 4 is constituted by MOS transistors, therefore, it is possible to reduce the size and the consumption power of the apparatus by fully utilizing a low consumption power and a high integration degree which are the characteristic features of MOS transistors.

Also, in the configuration shown in FIG. 4, the noise-portion sample-and-hold circuit and the signal-portion sample-and-hold circuit are completely symmetrically designed. Additionally, the outputs from these circuits are switched and simultaneously transferred to the subsequent stage. This essentially reduces noise from the signal and thereby improves the S/N ratio. Furthermore, since the gain of the sample-and-hold circuit is determined by the ratio of the capacitors, when formed into an IC it well matches the characteristic that the relative accuracy is very high compared to the absolute accuracy with respect to the constants of the individual circuits. Also, the capacitance ratio of the capacitors is nearly completely determined by the geometrical dimensions, so it is possible to realize a circuit with a very high accuracy even in comparison with a circuit using a resistance ratio. Moreover, the gain of the inverting amplifier has very little effect on the entire circuit. This also compensates for the drawback that the gain of the amplifier readily varies when formed into an IC.

Figure 6:
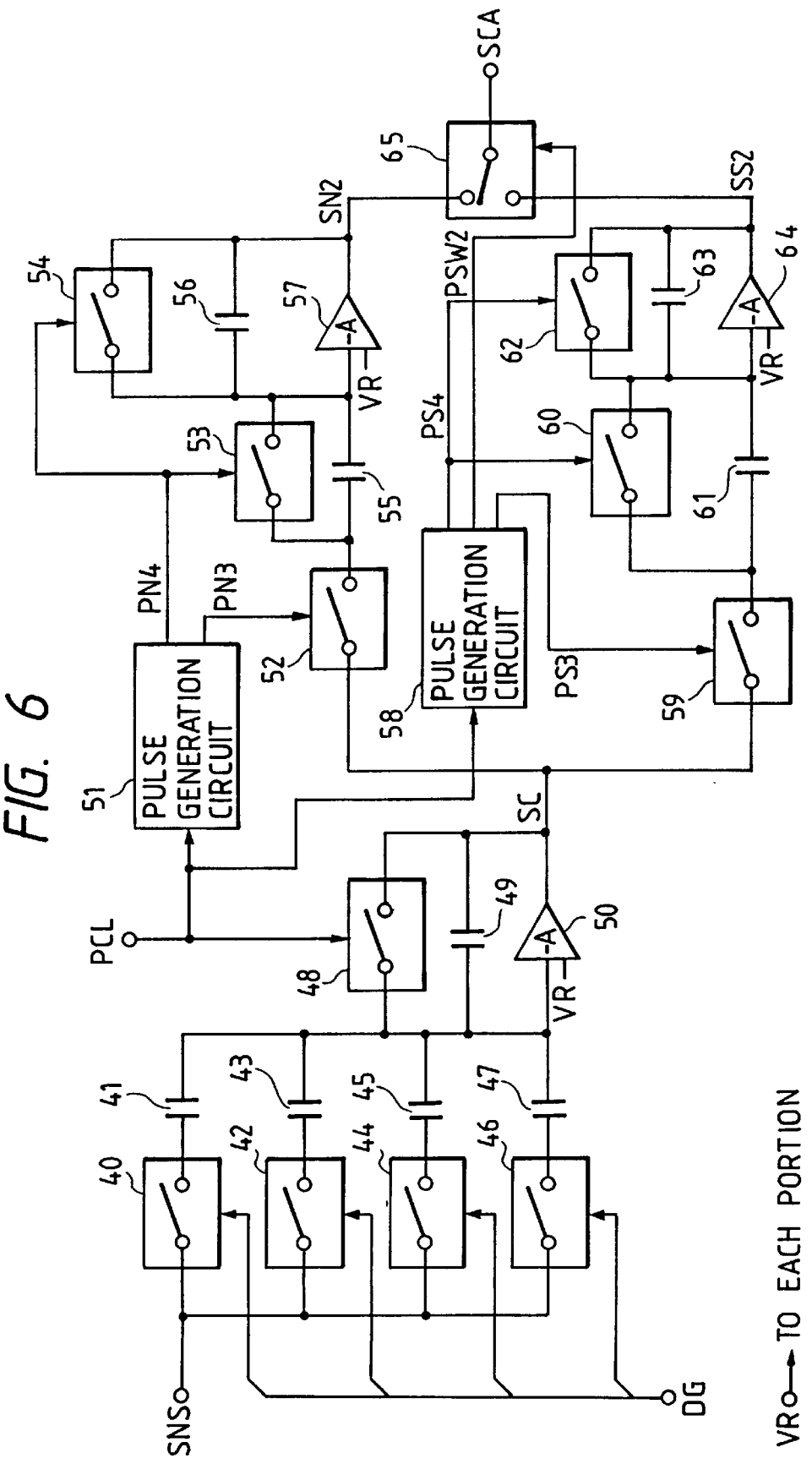
FIG. 6 is a circuit diagram showing the configuration of a clamp-type amplifier in the digitization circuit in FIG. 2.

FIG. 6 shows the configuration of the clamp-type amplifier 13.

Referring to FIG. 6, the clamp-type amplifier 13 comprises switch circuits 40, 42, 44, 46, 48, 52, 53, 54, 59, 60, 62, and 65, capacitors 41, 43, 45, 47, 49, 55, 56, 61, and 63, inverting amplifiers 50, 57, and 64, and pulse generation circuits 51 and 58.

The operation will be described below.

The output signal SNS from the switch circuit 12 is applied to the circuit consisting of the switch circuits 40, 42, 44, and 46 and the capacitors 41, 43, 45, and 47. The control terminals of these switch circuits are applied with the gain set signal DG generated by the gain set switch (not shown) or the camera control circuit (not shown). Of these switch circuits, those set by DG are turned on, and SNS is applied to the capacitors connected to the ON switch circuits. Consequently, the capacitances of these capacitors are equivalently made variable. The other terminals of the capacitors 41, 43, 45, and 47 are connected together to the input terminals of the switch circuit 48, the capacitor 49, and the inverting amplifier 50. The clamp pulse PCL is applied to the control terminal of the switch circuit 48.

When the input signal is a noise portion, the switch circuit 48 is turned on by the clamp pulse, the charge of the capacitor 49 becomes 0, and at the same time the output from the inverting amplifier 50 becomes the reference voltage VR. Thereafter, the switch circuit 48 is turned off and a signal portion of SNS is input. Consequently, of the capacitors 41, 43, 45, and 47, those whose corresponding switch circuits are ON are charged, and a charge equal to the total charge flows into the capacitor 49. The result is that a voltage corresponding to the difference between the noise portion and the signal portion is obtained from the output of the inverting amplifier 50.

At this time, the charge amount flowing into the capacitor 49 is proportional to the total sum of the capacitances of the capacitors 41, 43, 45, and 47 set by DG. Therefore, assuming the capacitance ratio of the capacitors 41, 43, 45, and 47 is 1:2:4:8, these capacitors are so connected that the LSB of DG is applied to the capacitor 41 and its MSB is applied to the capacitor 47. As a consequence, the gain can be amplified in proportion to the binary number set in DG.

The output from the inverting amplifier 50 is divided into two portions: one is connected to the first amplifier consisting of the switch circuits 52, 53, and 54, the capacitors 55 and 56, the inverting amplifier 57, and the pulse generation circuit 51, and the other is connected to the second amplifier consisting of the switch circuits 59, 60, and 62, the capacitors 61 and 63, the inverting amplifier 64, and the pulse generation circuit 58.

The first amplifier operates similarly to the sample-and-hold circuit 10, FIG. 4. The pulse generation circuit 51 receives the clamp pulse PCL and generates a pulse corresponding to the noise portion of the output signal SC from the inverting amplifier 50. Accordingly, assuming that the capacitance of the capacitor 55 is C3 and the capacitance of the capacitor 56 is C4, a signal SN2 which is formed by amplifying the SC noise portion with a gain G2=C3/C4 is attained at the output of the inverting amplifier 57.

Analogously, in the second amplifier 2 the pulse generation circuit 58 receives the clamp pulse PCL and generates a pulse corresponding to the signal portion of the output signal SC from the inverting amplifier 50. Therefore, assuming that the capacitances of the capacitors 61 and 63 are C5 and C6, a signal SS2 formed by amplifying the signal portion of SC with a gain G3=C5/C6 is obtained at the output of the inverting amplifier 64. The selector 65 outputs SCA by switching SN2 and SS2 in accordance with the switch pulse PSW2 generated by the pulse generation circuit 58.

FIGS. 7A to 7K are timing charts for explaining the operation of the clamp-type amplifier 13.

Figure 7:
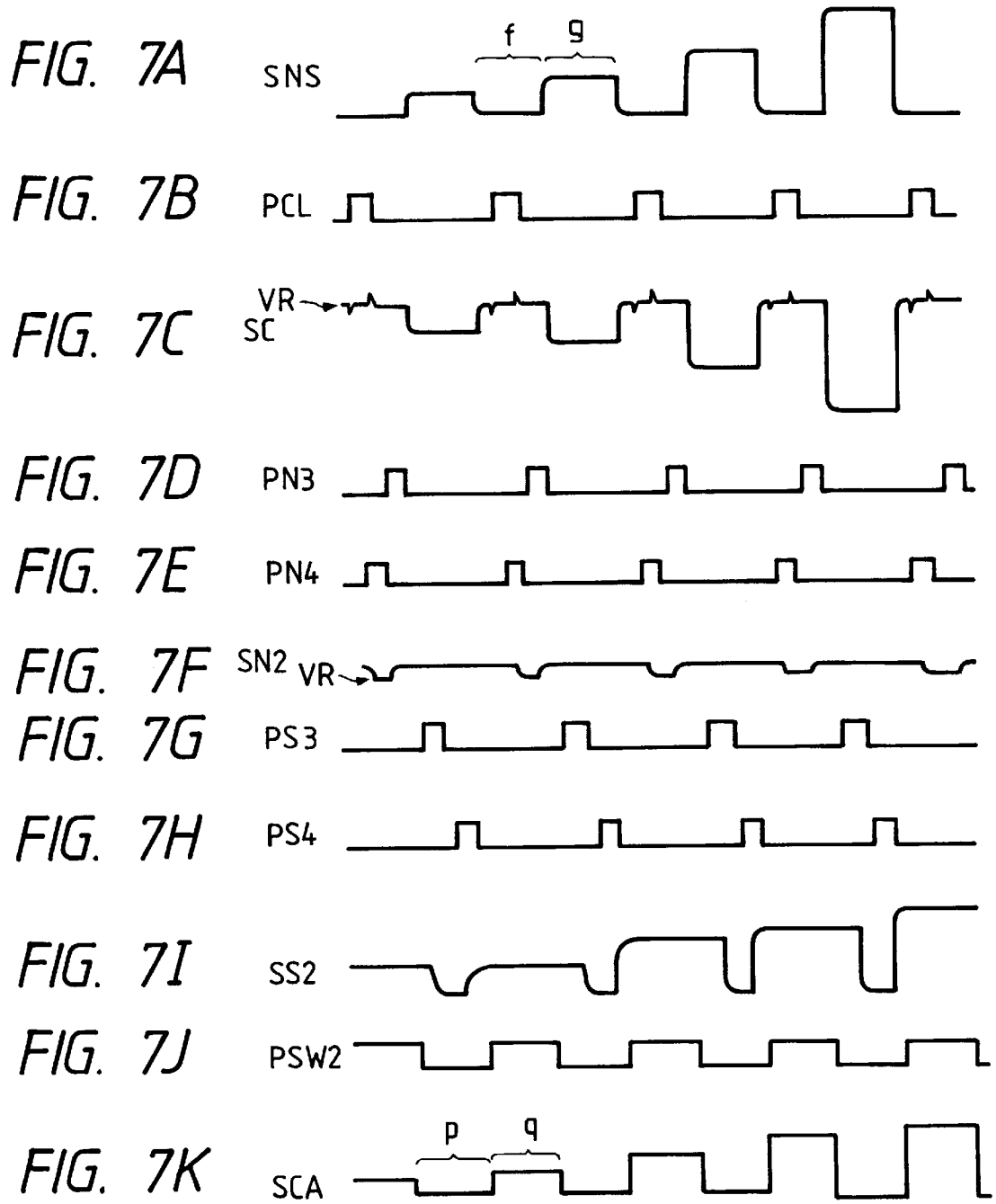
FIGS. 7A to 7K are timing charts for explaining the operation of the clamp-type amplifier in FIG. 6.

FIG. 7A shows the input signal SNS having the noise portion f and the signal portion g.

FIG. 7B shows the clamp pulse PCL which changes to 1 at a timing corresponding to the noise portion of SNS.

FIG. 7C shows the output signal SC from the inverting amplifier 50, which has the reference voltage VR in a portion in which the switch circuit 48 is turned on by PC. The signal portion is amplified with the gain set by DG as described.

FIGS. 7D and 7E show PN3 and PN4, respectively, generated by the pulse generation circuit 51. The switch circuit 52 is turned on by PN3, and the input signal is amplified and output. The switch circuits 53 and 54 are turned on by PN4, the charges in the capacitors 55 and 56 become 0, and the output signal SN2 becomes VR.

FIG. 7F shows the noise signal SN2 amplified in the way as above.

FIGS. 7G and 7H show PS3 and PS4, respectively, generated by the pulse generation circuit 58. The switch circuit 59 is turned on by PS3, and the input signal is amplified and output. The switch circuits 60 and 61 are turned on by PS4, the charges in the capacitors 61 and 63 become 0, and the output signal SS2 becomes VR.

FIG. 7I shows the signal SS2 thus amplified.

FIG. 7J shows the switch pulse PSW2 of the switch circuit 65, which is generated by the pulse generation circuit 58. A portion of 0 corresponds to SN2, and a portion of 1 corresponds to SS2.

FIG. 7K shows the output signal SCA from the switch circuit 65. SCA also consists of a noise portion p and a signal portion q. The signal SCA is amplified with the gain, set by DG, with respect to the input signal SNS.

In the circuit in FIG. 6, the circuit gain is varied by four switch circuits and four capacitors. However, the numbers of these components can be increased or decreased where necessary. As an example, if it is necessary to perform switching in 256 steps, the circuit can be constituted by eight switch circuits and eight capacitors. It is also possible to generate the pulses PN3, PN4, PS3, PS4, and PSW2 directly from the sync pulse generation circuit described earlier, without using the pulse generation circuit.

As with the configuration shown in FIG. 4, the configuration in FIG. 6 makes use of switch circuits, capacitors, buffer amplifiers, inverting amplifiers, and pulse delays, and these constituent components can be realized very easily by using MOS transistors. When the configuration shown in FIG. 6 is constituted by MOS transistors, therefore, it is possible to reduce the size and the consumption power of the apparatus by fully utilizing a low consumption power and a high integration degree which are the characteristic features of MOS transistors. Also, in the configuration shown in FIG. 6 the noise-portion amplifier and the signal-portion amplifier are completely symmetrically designed. Additionally, the outputs from these amplifiers are switched and simultaneously transferred to the subsequent stage. This essentially reduces noise from the signal and thereby improves the S/N ratio.

Furthermore, since the gain of the sample-and-hold circuit is determined by the ratio of the capacitors, when formed into an IC it well matches the characteristic that the relative accuracy is very high compared to the absolute accuracy with respect to the constants of the individual circuits. Also, the capacitance ratio of the capacitors is nearly completely determined by the geometrical dimensions, so it is possible to realize a circuit with a very high accuracy even in comparison with a circuit using a resistance ratio. Moreover, the gain of the inverting amplifier has very little effect on the entire circuit. This also compensates for the drawback that the gain of the amplifier readily varies when formed into an IC.

In addition, the gain of the variable gain amplifier can be directly set by a digital signal, resulting in very small variations or temperature changes of individual amplifiers during mass production. Also, since the gain can be directly controlled by a digital circuit such as a microcomputer, no D/A converter for gain adjustment is required.

Figure 8:
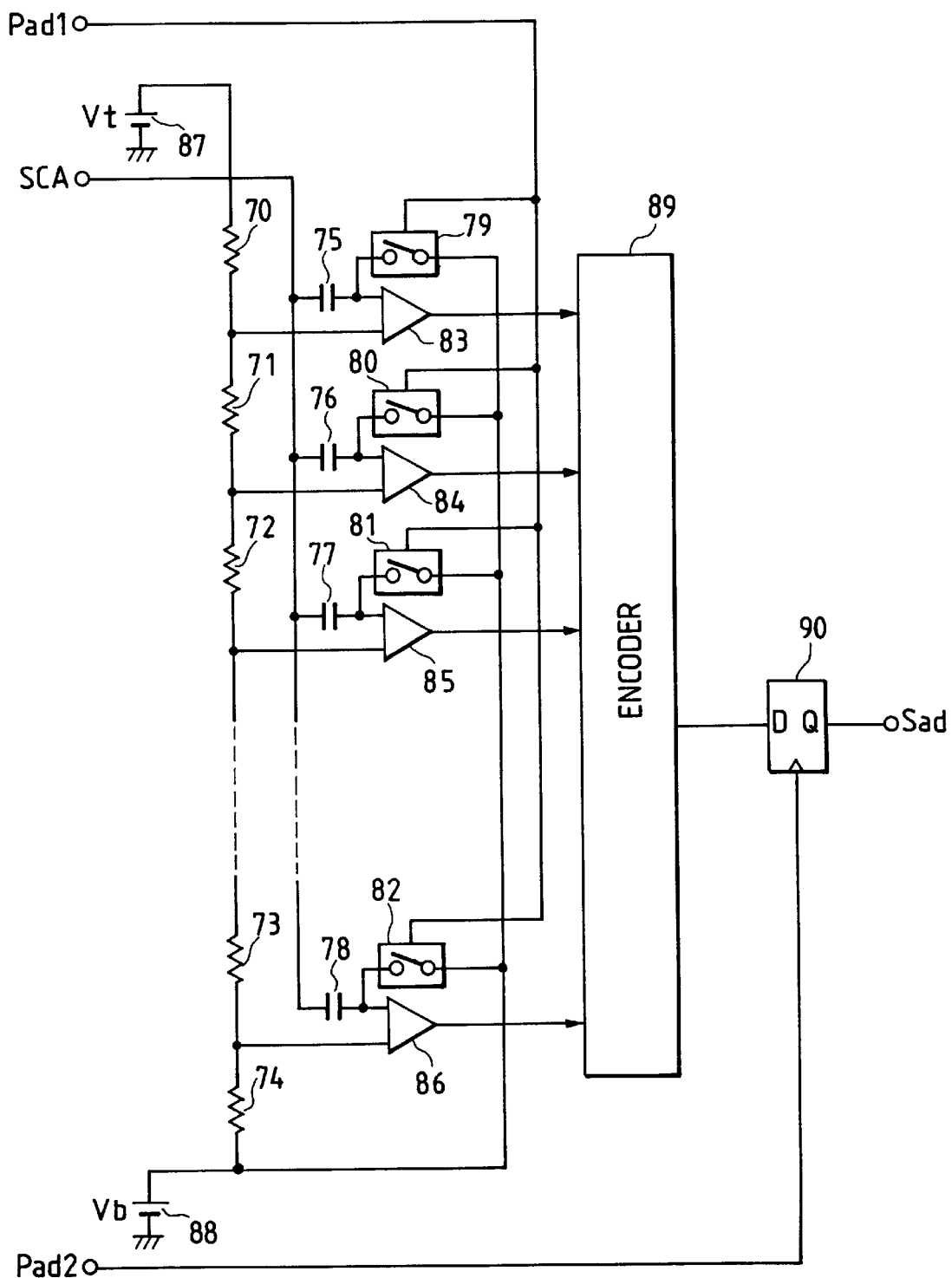
FIG. 8 is a circuit diagram showing the configuration of an A/D converter in the digitization circuit in FIG. 2.

FIG. 8 shows the configuration of the A/D converter 14.

The A/D converter 14 includes resistors 70 to 74, capacitors 75 to 78, switch circuits 79 to 82, comparators 83 to 86, reference voltages 87 and 88, an encoder 89, and a D flip-flop 90. Note that only a portion of the circuit is illustrated in FIG. 8 for the sake of illustrative simplicity. However, the actual circuit needs $2^n$ resistors, $2^n-1$ capacitors, $2^n-1$ comparators, and $2^n-1$ switch circuits, in order to obtain an n-bit digital output.

The input signal SCA is applied to the capacitors 75 to 78. The other electrode of each of the capacitors 75 to 78 is connected to one input terminal of a corresponding one of the switch circuits 79 to 82 and one input terminal of a corresponding one of the comparators 83 to 86. The other input terminals of the comparators 83 to 86 are connected to the taps of a voltage divider constituted by the resistors 70 to 74. The other terminal of the uppermost resistor 70 of this voltage divider is connected to Vt of the reference voltage 87. The other terminal of the lowermost resistor 74 of the voltage divider is connected to Vb of the reference voltage 88. The other terminals of the switch circuits 79 to 82 are connected to the reference voltage Vb. A pulse Pad1 is applied to the control terminals of the switch circuits 79 to 82. Pad1 is a pulse corresponding to a portion which corresponds to the noise portion of the input signal SCA.

The outputs from the comparators 83 to 86 are applied to the encoder 89. The encoder 89 compares the input data from the LSB side and outputs a binary number corresponding to a portion in which 1 changes to 0. The output of the encoder 89 is connected to the D terminal of the D flip-flop 90. A pulse Pad2 is applied to the clock terminal of the D flip-flop 90. The D flip-flop 90 outputs data, Sad2, at the leading edge of Pad2.

The operation will be described below. First, the noise portion of the input signal SCA is input when the switch circuit 81 is OFF. When the switch circuit is turned on by Pad1, a voltage Vscan−Vb is charged into the capacitors 75 to 78 where Vscan is the voltage of the noise portion of SCA. When the switch circuit is again turned off and the signal portion of SCA is applied, the voltage at the input terminal, on the capacitor side, of each comparator goes to Vscas−Vscan+Vb where Vscas is the voltage of the signal portion of SCA.

The voltage at the other input terminal of each comparator is $$Vb+m*Va$$

where $Va=(Vt-Vb)/2^n$
assuming the comparator is the mth one from the bottom. Consequently, the output from each comparator is determined by the sign of the difference between the two input voltages to the comparator given by Equation (3):

$$(Vscas-Vscan+Vb)-(Vb+m*Va) = (Vscas-Vscan)-m*Va \quad (3)$$

As represented by Equation (3), the output of the comparator is determined only by the difference between the signal level and the noise of SCA and by the reference voltage. Therefore, the comparator output is unaffected by a DC drift caused by a temperature change, low-frequency noise, and a variation of the power-supply voltage. The S/N ratio also can be improved because common noise components contained in the noise portion and the signal portion of the input signal SCA are canceled. Upon receiving these comparator outputs, the encoder 89 outputs a binary code corresponding to a portion in which 1 changes to 0 as described earlier.

FIGS. 9A to 9G are timing charts for explaining the operation of the A/D comparator 14.

FIG. 9A shows the input signal SCA. Similar to FIG. 7K, the input signal SCA consists of the noise portion p and the signal portion q.

FIG. 9B shows Pad1. This pulse is generated at a timing corresponding to the noise portion of SCA.

FIG. 9C shows the input signal to each comparator. The portion p of SCA is given as the voltage Vb by Pad1.

FIG. 9D shows the output signal from a given comparator. The other input than the input shown in FIG. 9C of this comparator is applied with a voltage Vx in FIG. 9C. Accordingly, the signal in FIG. 9D is 1 when the voltage of the signal in FIG. 9C exceeds Vx.

FIG. 9E shows the output from the encoder 89. A digital signal corresponding to the input signal SCA is obtained.

FIG. 9F shows Pad2. At the timing of this pulse a digital signal corresponding to the signal portion of SCA is extracted from the signal in FIG. 9E.

FIG. 9G shows the output Sad from the D flip-flop 90. Only a digital signal corresponding to the signal portion is extracted from the signal in FIG. 9E.

Although a flash-type A/D converter is constituted in FIG. 8, a configuration called a half flash is also possible. As an example, it is well known that a half-flash A/D converter can be constituted by using two 4-bit flash-type A/D converters, a 4-bit D/A converter, a signal delay circuit, and a subtraction circuit. These two A/D converters can also have the configuration illustrated in FIG. 8.

As with the configuration shown in FIG. 4, the configuration in FIG. 8 makes use of switch circuits, capacitors, buffer amplifiers, inverting amplifiers, and pulse delays, and these constituent components can be realized very easily by using MOS transistors. When the configuration shown in FIG. 8 is constituted by MOS transistors, therefore, it is possible to reduce the size and the consumption power of the apparatus by fully utilizing a low consumption power and a high integration degree which are the characteristic features of MOS transistors.

Also, in the configuration shown in FIG. 8 the noise-component amplifier and the signal-component amplifier are completely symmetrically designed. Additionally, the outputs from these amplifiers are switched and simultaneously transferred to the subsequent stage. This essentially reduces noise from the signal and thereby improves the S/N ratio. Furthermore, since the gain of the sample-and-hold circuit is determined by the ratio of the capacitors, when formed into an IC it well matches the characteristic that the relative accuracy is very high compared to the absolute accuracy with respect to the constants of the individual circuits. Also, the capacitance ratio of the capacitors is almost completely determined by the geometrical dimensions, so it is possible to realize a circuit with a very high accuracy even in comparison with a circuit using a resistance ratio. Moreover, the gain of the inverting amplifier has very little effect on the entire circuit. This also compensates for the drawback that the gain of the amplifier readily varies when formed into an IC.

Furthermore, the gain of the variable gain amplifier can be directly set by a digital signal, resulting in very small variations or temperature changes of individual amplifiers during mass production. Also, since the gain can be directly controlled by a digital circuit such as a microcomputer, no D/A converter for gain adjustment is required.

As has been described, according to the first embodiment of the present invention the digitization circuit processes an output signal from the image sensor by using the IC different from the IC of the digital processing circuit. Consequently, it is possible to minimize the influence which the noise generated by the digital processing circuit has on the output signal from the image sensor. Also, the influence of the noise can be reduced since all analog signals are processed inside the IC of the digitization circuit.

Accordingly, even if the apparatus as a whole has the same configuration as the conventional one, it is free from the influence of these noise sources and can have a high S/N ratio. In addition, upon miniturized the apparatus does not require an electromagnetic shield for reducing noise from peripheral circuits. For this reason, the apparatus can be miniturized to a desired degree without limitations. Furthermore, since the number of components constituting the apparatus is very small, the apparatus can be rendered small in size and can achieve low consumption power.

According to another embodiment of the present invention, in transferring the signals from the sample-and-hold circuit to the variable gain amplifier and from the variable gain amplifier to the A/D converter, a noise portion and a signal portion are transmitted for each pixel, and in the subsequent stage the noise portion is essentially subtracted from the signal portion. Therefore, the signal is unaffected by a temperature change, external noise, power supply noise, and low-frequency noise from active elements.

Accordingly, even if the characteristics of the individual circuits are unsatisfactory, e.g., even if the values of a power-supply voltage variation, the suppression ratio of a voltage drift caused by a temperature change, and a low-frequency noise voltage are much larger than are commonly needed, satisfactory characteristics can be obtained as a whole circuit. This eliminates the need for a correction circuit for each circuit, and it is also unnecessary to flow an extra current to improve the characteristics. This results in no adjustment required and reductions in the cost, the consumption power, and the circuit area.

Furthermore, when miniaturized the apparatus is not easily influenced by the peripheral circuits, so an electromagnetic shield is unnecessary. In particular, the use of MOS transistors as active elements greatly reduces the consumption power and increases the integration degree. This makes a small-sized, low-power-dissipating apparatus feasible. Additionally, since the chip area can be decreased in the manufacture of the digitization circuit as a one-chip IC, the manufacturing process yield is improved. The accuracy is also improved because the characteristic variation in the circuits of the chip can be suppressed.

What is claimed is:

1. An image pickup apparatus comprising:
   (a) image pickup means for forming an image signal that includes a bit image signal and a subsequent bit noise signal alternately bit by bit; and
   (b) one-chip process means including:
      (b-1) first and second sample-hold means for respectively and alternately separating the bit image signal and the bit noise signal from said image signal bit by bit;
      (b-2) first amplifier means for receiving the bit image signal and amplifying the received bit image signal and second amplifier means for receiving the subsequent bit noise signal and amplifying the received bit noise signal; and
      (b-3) A-D converting means for receiving the bit image signal amplified by said first amplifier means and the subsequent bit noise signal separately amplified by said second amplifier means, said A-D converting means forming a digital image signal from the received bit image signal and subsequent bit noise signal.

2. An apparatus according to claim 1, wherein respective gains of said first and second amplifier means are variable.

3. An apparatus according to claim 1, further comprising one-chip digital signal processing means connected to an output of said A-D converting means.

4. An image pickup apparatus comprising:
   (a) image pickup means for forming an image signal; and
   (b) process means including:
      (b-1) first and second sample-hold means for respectively and alternately separating the bit image signal and the bit noise signal from said image signal bit by bit;
      (b-2) first amplifier means for receiving the bit image signal and amplifying the received bit image signal and second amplifier means for receiving the subsequent bit noise signal and amplifying the received bit noise signal; and (b-3) A-D converting means for receiving the bit image signal amplified by said first amplifier means and the subsequent bit noise signal separately amplified by said second amplifier means, said A-D converting means forming a digital image signal from the received bit image signal and subsequent bit noise signal.

5. An apparatus according to claim 4, wherein respective gains of said first and second amplifier means are variable.

6. An apparatus according to claim 4, further comprising one-chip digital signal processing means connected to an output of said A-D converting means.

7. An apparatus according to claim 6, wherein said process means is a one-chip integrated circuit.

* * * * *